T. ROBJOHN, Dec'd.

Assignor, by mesne assignments, to G. H. WOOSTER.

Fluting-Machine.

No. 8,174. Reissued April 16, 1878.

Witnesses.
E. B. Perkins.
W. T. Miller

Inventor.
Thomas Robjohn
Assor to Geo H. Wooster
per Crosby & Gregory attys.

N. PETERS, PHOTO-LITHOGRAPHER, WASHINGTON, D. C.

T. ROBJOHN, Dec'd.

Assignor, by mesne assignments, to G. H. WOOSTER.

Fluting-Machine.

No. 8,174. Reissued April 16, 1878.

Witnesses. C. C. Perkins. W. T. Miller

Inventor. Thomas Robjohn Assor to Geo H. Wooster per Crosby & Gregory Attys.

H. PETERS, PHOTO-LITHOGRAPHER, WASHINGTON, D. C.

UNITED STATES PATENT OFFICE.

GEORGE H. WOOSTER, OF NEW YORK, N. Y., ASSIGNEE, BY MESNE ASSIGNMENTS, OF THOMAS ROBJOHN, DECEASED.

IMPROVEMENT IN FLUTING-MACHINES.

Specification forming part of Letters Patent No. 39,328, dated July 21, 1863; Reissue No. 1,556, dated October 27, 1863; Reissue No. 8,174, dated April 16, 1878; application filed November 23, 1877.

*To all whom it may concern:*

Be it known that THOMAS ROBJOHN, of the city, county, and State of New York, invented certain Improvements in Machines for Making Ruffles; and that the following is a full, clear, and exact description of the said invention, reference being had to the accompanying drawings, forming part of this specification, in which—

Figure 1:
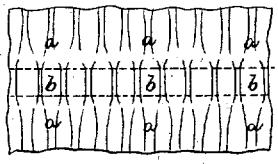
Figure 2:
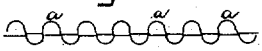
Figure 3:
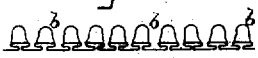
Figure 6:
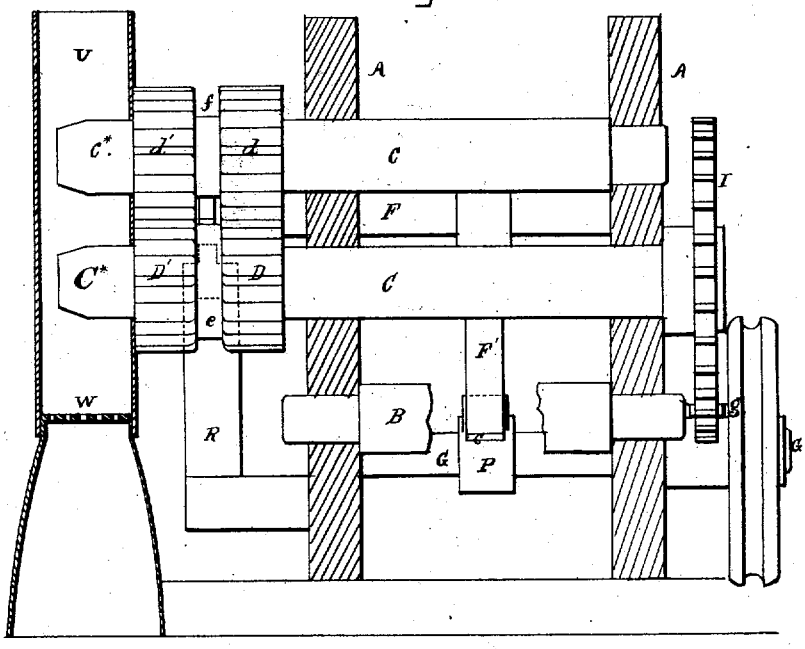
Figure 4:
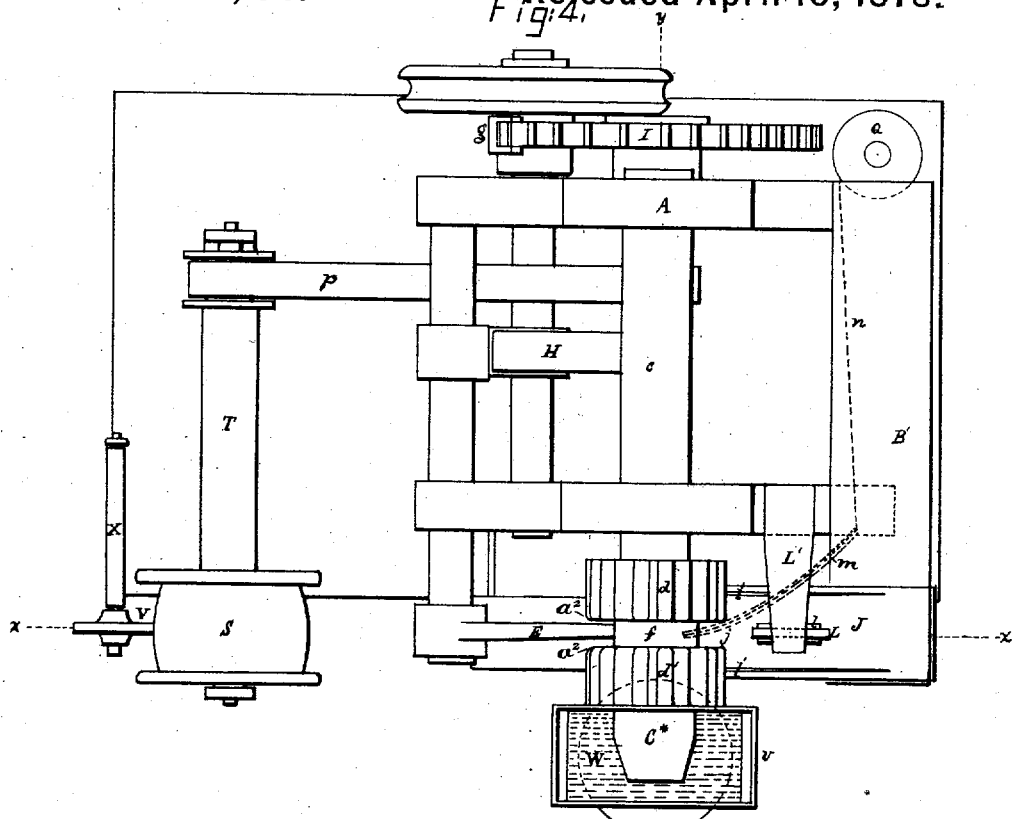
Figure 5:
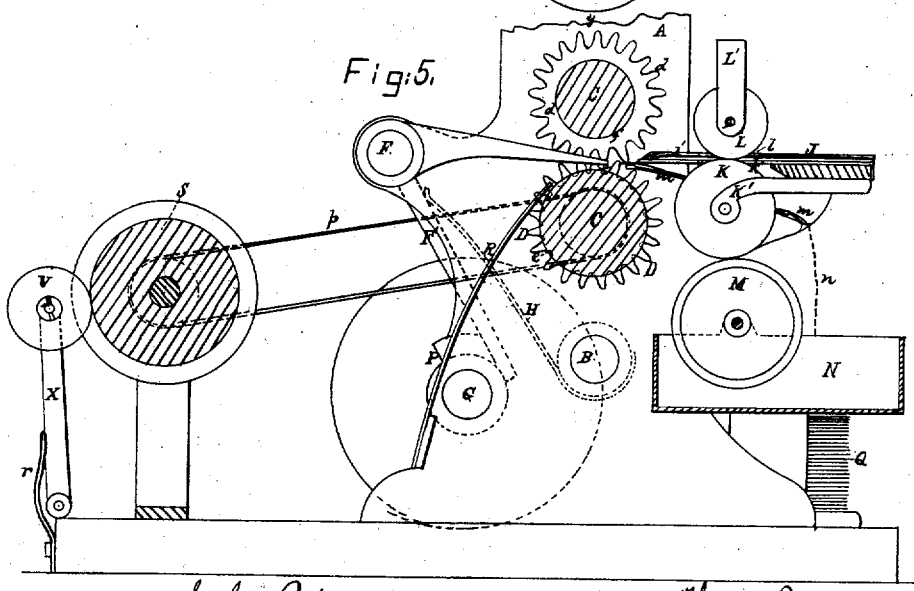

Figure 1 is a face view of a piece of ruffling made by the machine. Fig. 2 is an edge view of the same. Fig. 3 is a central longitudinal section of the same. Fig. 4 is a plan of the machine. Fig. 5 is a vertical section of the same in the plane indicated by the line *x x* in Fig. 4. Fig. 6 is a vertical section of the same in the plane indicated by the line *y y* in Fig. 4.

Similar letters of reference indicate corresponding parts in the several figures.

This machine is intended to produce a ruffle composed of a series of plaits and frills, the plaits being flattened to present the appearance of a band, as shown at *b b* in Figs. 1 and 3.

The invention consists in a novel combination of fluting-rollers and an interposed presser or folding device, for the purpose of producing the frills and flattened plaits at one operation.

It also consists, in the employment of a stripper, operating between and in combination with the fluting-rollers, to detach the ruffle from the rollers in case of its adhesion thereto.

It also consists in the employment, in combination with the fluting-rollers, of a gage to guide the strip of muslin or other material to the said rollers in such a manner as to equalize and regulate the width of the frills.

It also consist in a novel construction of the gage, whereby it is made to present the strip to the fluting-rollers in a flat and smooth condition.

It also consists in the combination of fluted rollers, presser, stripper, and gage or guide, for the manufacture of ruffles.

It also consists in the employment of a starching apparatus, in combination with the fluting-rollers and presser, to apply starch to one side of the flattened portion of the ruffle, to enable the plaits to better retain their folded condition.

It also consists in certain means of delivering a thread to one surface of the plaits in such manner that by the application of starch to the plaits the said thread may be caused to adhere to them and hold them together until they can be secured by stitching; and it consists, finally, in a certain mode of heating the fluting-rollers, and in a fluted roller with the ends of its teeth rounded.

A A are two standards, united by cross-bars B B′, to constitute the framing of the machine. C *c* are the shafts of the fluting-rollers D D′ *d d′*, arranged horizontally, one above the other, in suitable bearings in the standards A A.

The rollers (two shown upon each shaft) are arranged outside of one of the standards A A, and arranged in pairs one above another, D *d* constituting one pair, and D′ *d′* the other; and the two pairs are arranged at a distance apart a little greater than the desired width of the central flattened or plaited portion of the ruffling.

The rollers are constructed substantially like ordinary fluting-rollers, except that the fluting-ridges of each pair are rounded off slightly at their ends, as shown in Figs. 4 and 6, to prevent them from cutting the fabric.

Between the two lower rollers D D′ there is provided on the shaft C a concentric cylindrical surface, *e*, the upper part of which comes slightly above the bottoms of the upper grooves of the rollers to form a pressing-surface, upon which the flutes produced in the fabric by the fluting-rollers are folded down by the folding device or presser E, and flattened into plaits *b b* between the two pairs of rollers. The space between the two upper rollers *d d′* must be deep enough to permit the operation of the presser.

The presser E is represented as consisting of a flat-ended metal finger attached to a rocker-shaft, F, which is arranged in suitable bearings in the standards A A, behind the fluting-rollers, and its pressure upon the goods is produced by a spring, H, which is attached to the cross-piece B of the framing, and bears against an arm, F′, of the rocker-shaft F. The pressure thus produced is of a yielding nature, so that it will not injure the goods.

The operation of the presser, as represented, is made intermitting, that it may have a separate action upon each flute of the ruffle as the latter is presented under it by the movement given to it by the fluting-rollers.

The intermissions in the operation of the presser are produced by the action upon the arm F′ of a cam, P, on the constantly-rotating main shaft of the machine. With the presser having the intermitting action, as before described, are employed intermittingly-rotating fluting-rollers. The operations of the rollers and presser alternate with each other, the presser operating while the rollers are stationary, and the rollers operating while the presser is raised and its pressure is relaxed.

The movements of the rollers are produced by the operation of a single tooth, *g*, on the main shaft G operating upon a toothed wheel, I, on the roller-shaft D, the number of the teeth of the said wheel corresponding with the number of ridges in each fluting-roller, the said tooth moving the wheel to the extent of one tooth during every revolution of the main shaft, which should be at a very high velocity.

J is a stationary guide, arranged in front of the fluting-rollers, for conducting the strip of muslin or other material to the said rollers, composed of a flattened horizontal tube of metal, of a width just sufficient for the strip to pass through it. The upper part of the said tube is slit, as shown at *i i* in Fig. 4, to form a tongue, *j*, (shown in Figs. 4 and 5,) to press upon the upper part of the strip, the width of the said tongue being such that it fits between the hems at the edge of a strip of muslin or other fabric, or between the corded edges of a piece of ribbon, and so keeps the strip or ribbon extended laterally, and causes it to be presented in a flat and smooth condition to the fluting-rollers. In the top and bottom of this guide there are central openings *k* and *l*, for the entrance of two rollers, K and L, arranged above and below it, the lower roller, K, taking starch from a roller, M, which rotates in the starch-box N, and the upper one, L, holding the strip in contact with the lower one, K, and causing the starch to be applied all along the middle of its under surface as it passes through the guide on its way to the fluting-rollers.

The roller K is supported by a rigid arm, K′, secured to the cross-bar B′; but the roller L is supported by an elastic arm, L′, which keeps it pressed down upon the strip, and presses the strip against the starched surface of K. Both of these rollers derive motion from the friction produced by the strip in passing between them. The roller M, which is supported in bearings on the sides of the starch-box, derives rotary motion from the friction of the roller K, which works in contact with it.

The distance of the guiding-edges of the guide from the spaces between the two pairs of rollers determines the location of the plaits in the ruffle.

*m* is a thread-conductor, consisting of a tube secured to one of the standards A A, for the purpose of conducting a thread, *n*, (shown in dotted lines,) from a spool, Q, under the guide J to the surface of the surface *e* under the strip to be ruffled. This thread is kept out of contact with the strip until it has been fluted, and meets it at the point where the flattening and conversion of the central portions of the flutes into plaits takes place, and is caused by the action of the presser to adhere to the starched surface of the plaits. The thread thus adhering to the plaits serves to hold them together and keep them in place until they have been secured by stitching. The plaits will generally be seamed by stitching them in a sewing-machine in two parallel rows, which are dotted in Fig. 1.

R is the stripper, consisting of a flexible blade with a thin end, secured to the framing of the machine behind the lower fluting-rollers, and pressing upon the surface *e* between the lower rollers, for the purpose of detaching the fluted and plaited strip and the thread *n* from the said surface *e* in case of its having been stuck thereto by the starch.

S V are two rollers, by which the ruffling or frilling is taken from the fluting-rollers and delivered into a suitable receptacle as fast as it is made. The roller S is as wide as the whole width of the frilling, and secured upon a shaft, T, which is driven by a belt, *p*, from the roller-shaft C. The roller V has a narrow face, to press upon the central plaited or flat part of the frilling, and is held in contact therewith by means of a spring, *r*, which presses against a swinging frame, X, in which the said roller is arranged, and the said roller rotates by the friction of the frilling passing between it and the roller S. The velocity of the periphery of the roller S is slightly greater than that of the surface *e* between the rollers D D′, that it may produce a slight draft upon the frilling, and so prevent it from being cockled up by the drying of the starch or by adhesion to the surface *e*.

To provide for the heating of the fluting-rollers by the flame of gas, the roller-shafts are extended beyond the outer pair of rollers D′ *d*′, as shown at C* *c**, and made to enter openings in one side of a metal chimney, U, which is placed upon a gas-burner, W, arranged below the said extended portions of the shafts. This burner is made with a grate of wire-gauze or finely-perforated sheet metal, to present a broad horizontal sheet or bed of flame. The portions C* *c** of the shafts fit the openings in the chimney in such a manner as to prevent smoking the rollers and soiling the material, which is always the case when the rollers are heated by a flame against their acting or working surfaces. The chimney acts to lead away the products of combustion after their action upon the shafts, and heat applied to one part of the rollers, not their acting faces, is by conduction permitted to pass to the acting faces of the rolls, which may, consequently, be kept clean.

The ends of the flutes of the fluted rollers at $a^2$ are rounded to prevent them from tearing or breaking the fabric, as they would do if left square. Gages control the position of the fabric at the right and left of the ends $a^2$, and at such ends it is unnecessary to round the flutes, as the fabric being fluted is so directed by a guide that it cannot, in its passage between the rollers, be acted upon by the square ends of the flutes of the rollers, the acting edge of such guide being located at a point between the rounded end of the roller and the square end.

What I claim as the invention of THOMAS ROBJOHN, and desire to secure by Letters Patent, is—

1. The combination of two pairs of rotating fluting-rollers and an interposed presser, to operate substantially as and for the purpose herein set forth.

2. In a fluting-machine, the combination of two rollers arranged to flute the fabric passing between them, with mechanism to impart to such rollers an intermitting motion.

3. A pair of fluting-rollers, in combination with a presser to press the flutes and form plaits, substantially as described.

4. The combination of a pair of fluting-rollers and a presser with mechanism adapted to actuate the rollers and presser intermittingly, substantially as described.

5. The combination, with the two pairs of fluting-rollers, of an interposed stripper, operating substantially as and for the purpose herein set forth.

6. The combination of two pairs of fluting-rollers and a gage to guide a strip of muslin or other material to both pairs of rollers, substantially as and for the purpose herein specified.

7. The flat tubular guide J, constructed with two slits, *i i*, and a tongue, *j*, substantially as and for the purpose herein set forth.

8. The combination of two pairs of fluting-rollers, a presser, a stripper, and a guide, to operate substantially as herein set forth.

9. The combination, with a guide to conduct a strip of muslin or other fabric to the fluting-rollers, of a starching-roller, substantially as described.

10. A thread-conductor, in combination with starching mechanism, fluting-rollers, and a presser, substantially as and for the purpose herein set forth.

11. In a fluting-machine, a pair of rollers provided with fluting-ridges rounded at the ends of the flutes, to prevent tearing or breaking of the fabric, substantially as described.

12. In a fluting-machine, the combination of intermittingly-actuated rollers, and mechanism to operate them, with a plaiter and mechanism to operate it, to press the plaits while the rollers are at rest, substantially as described.

13. In a fluting-machine, a pair of fluted rollers having the raised fluting-ridges rounded at one end, in combination with a support for such rollers, and a gage or guide for the material, one edge of such gage being located in a line between the rounded ends of the rollers and the support, substantially as described.

14. The combination, with the pair of rollers and a gas-burner to heat them, of a chimney to create a draft, substantially as described.

15. In the process of making ruffling, the starching a formed ruffle to a thread to hold the plaits together, substantially as described.

16. In an apparatus for making ruffling, the combination, with a plaiter and a pair of fluting-rollers, of mechanism to impart to such rollers an intermitting motion.

17. In combination with a pair of fluting-rollers, an auxiliary roller for the purpose of pressing the fluted material flat along some part of its surface after the same has been fluted, substantially as described.

18. In combination, a pressing mechanism and a device for delivering a thread to the pressed part, where, by starch, it is caused to adhere, substantially as described.

19. In combination with a fluting-machine, mechanism, substantially as described, to press the flutes by a flexible pressure, substantially as described.

20. In a machine for the manufacture of fluted or frilled trimming, a roller to operate upon the material being made into trimming, and means to conduct a gas-flame for heating the roller against a portion of the roller other than its acting periphery, to thereby avoid soiling or blacking the acting face or surface of the roller, substantially as described.

In testimony whereof I have signed my name to this specification in the presence of two subscribing witnesses.

GEO. H. WOOSTER.

Witnesses:
FREDERIC H. BETTS,
HERBERT E. KINNEY.